G. ZIMMERMAN.
COASTER BRAKE.
APPLICATION FILED SEPT. 14, 1911.
1,018,471.
Patented Feb. 27, 1912.
2 SHEETS—SHEET 1.
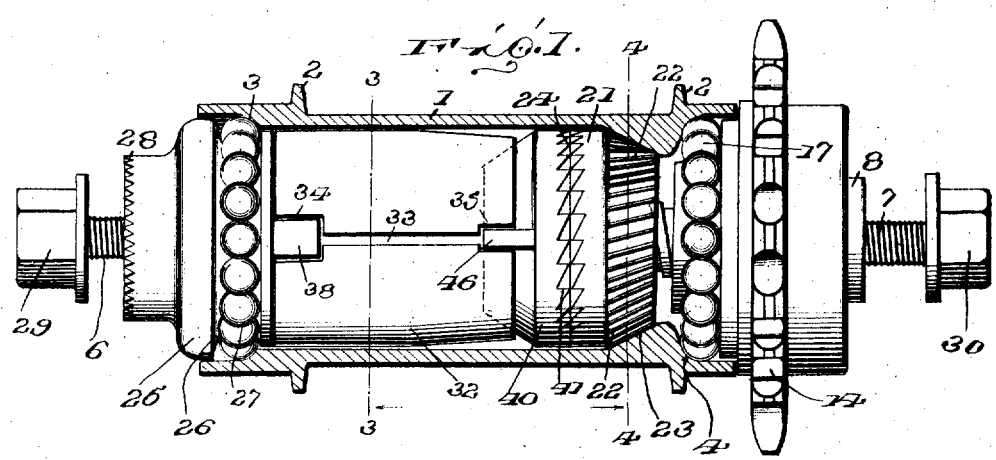
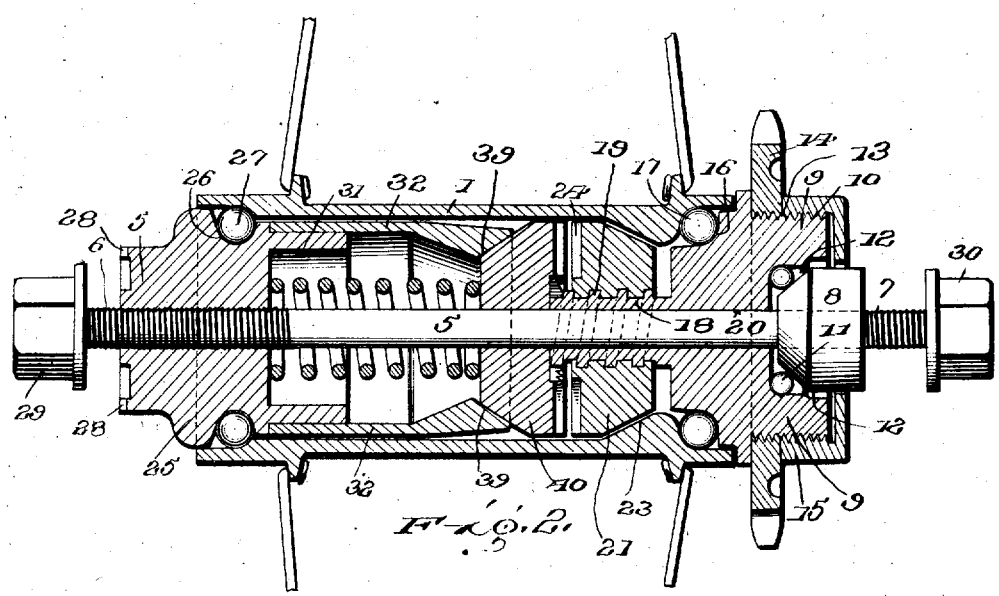
Witnesses
Inventor
G. Zimmerman
By
Attorney

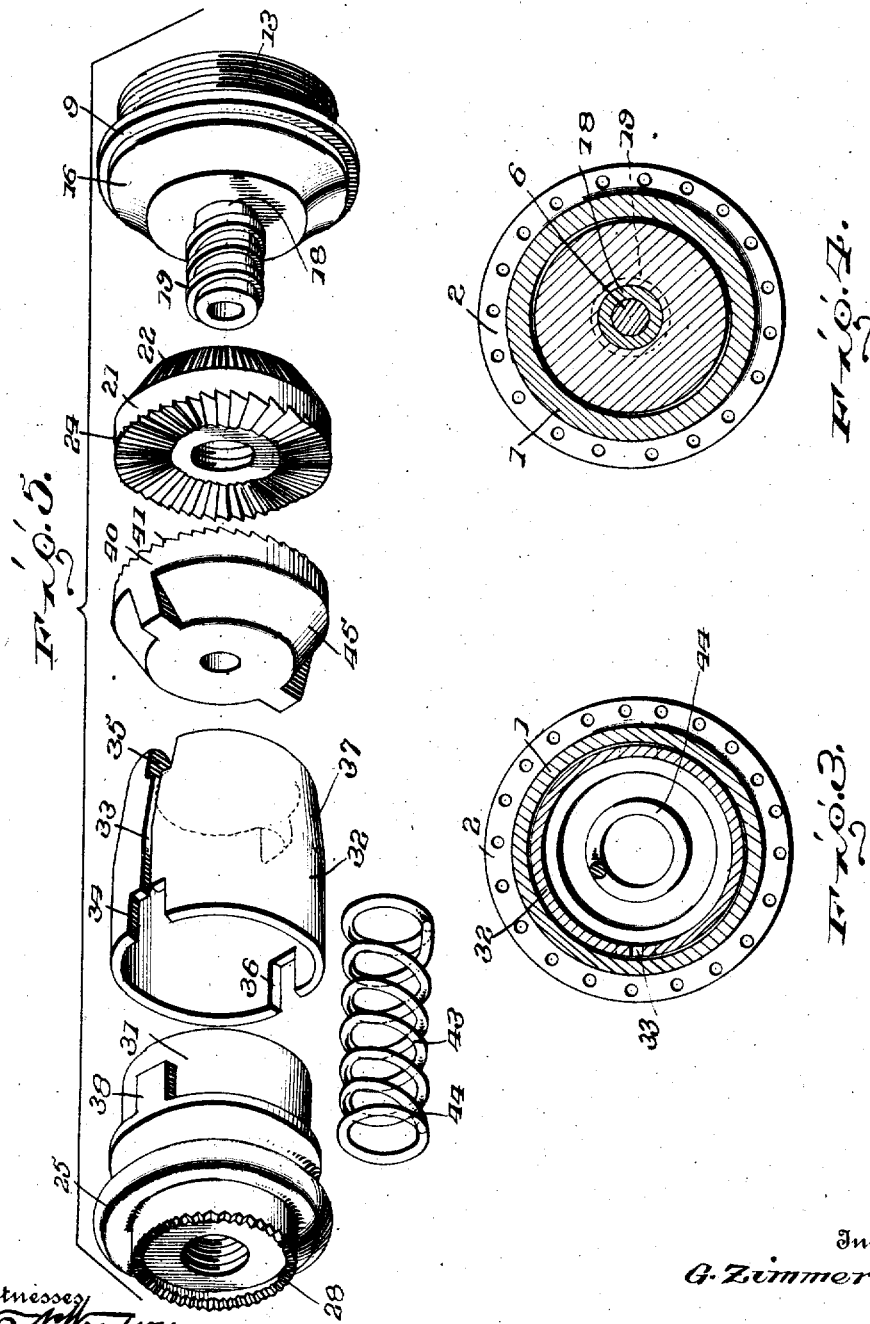

UNITED STATES PATENT OFFICE.

GUY ZIMMERMAN, OF VERSAILLES, ILLINOIS.

COASTER-BRAKE.

1,018,471.  Specification of Letters Patent.  Patented Feb. 27, 1912.

Application filed September 14, 1911. Serial No. 649,242.

*To all whom it may concern:*

Be it known that I, GUY ZIMMERMAN, citizen of the United States, residing at Versailles, in the county of Brown and State of Illinois, have invented certain new and useful Improvements in Coaster-Brakes, of which the following is a specification.

This invention relates to coaster brakes for bicycles and motor-cycles and aims to provide a coaster brake which will be positive in its action and will not be liable to "lock" when the brake is applied.

Also the invention aims to provide a brake of this type of such construction that it will not differ in appearance from the ordinary rear wheel hub.

The invention aims further to provide a coaster brake so constructed that its driving parts will not slip when the rider of the bicycle or motor cycle to which the brake is applied, pedals forwardly after having coasted.

In the accompanying drawing, Figure 1 is a view in elevation of the brake embodying the present invention, the hub of the brake being shown in longitudinal section. Fig. 2 is a vertical longitudinal sectional view through the brake. Fig. 3 is a vertical transverse sectional view on the line 3—3 of Fig. 1 looking in the direction indicated by the arrow. Fig. 4 is a similar view on the line 4—4 of Fig. 1, looking in the direction indicated by the arrows. Fig. 5 is a group perspective view illustrating several of the parts of the brake in position to be assembled.

Corresponding and like parts are referred to in the following description and indicated in all the views of the accompanying drawing by the same reference characters.

In the drawings there is shown a hub 1 which constitutes a part of the coaster brake mechanism embodying the present invention and takes the place of the ordinary rear wheel hub of the bicycle or motor-cycle to which the brake is applied, this hub being provided exteriorly with the usual flanges 2 for the attachment of the wheel spokes and being provided adjacent one end with a ball-race 3 and adjacent its other end with a ball-race 4. The spindle for the hub is indicated by the numeral 5 and is threaded at one end as at 6 and at the other end as at 7. This spindle 5 is of a length to extend entirely through the hub and project at its ends therebeyond, the said threaded ends of the spindle being fitted through the rear forks of the bicycle or motor-cycle frame as in the case of the ordinary hub spindle. A bearing cone 8 is formed or secured upon the spindle 5 immediately inwardly of the threaded end portion 7 thereof and slidably and rotatably fitted upon the spindle inwardly of this cone is a head 9 having a ball-race 10 in which are arranged bearing balls 11 traveling over the bearing face of the cone 8. The ball-race 10 in the head 9 is preferably formed at the bottom of a recess 12 in the outer side of the said head and the bearing cone 8 is partly received in this recess as illustrated in Fig. 2 of the drawings. The head 9 is exteriorly threaded as at 13 and a sprocket gear 14 is removably fitted thereon and is held in place by a cap 15 also threaded upon the portion 13 of the head 9 and bearing against the said sprocket gear. The head 9 is formed at its inner end with a ball-race 16 which, when the inner end of the head is properly fitted into the right hand end of the hub in Figs. 1 and 2 of the drawings, opposes the race 4, and bearing balls 17 are arranged within the two races.

A sleeve 18 projects inwardly from the inner face of the head 9 and is formed exteriorly with threads 19 and the said head has an opening 20 formed therethrough in axial alinement with the bore of the sleeve 18, and the spindle passes through the said bore of the sleeve and through the opening 20 as illustrated in Fig. 2 of the drawings. A clutch cone 21 is threaded onto the sleeve 18 and has a serrated clutch face 22 designed to coöperate with a similar face 23 formed interiorly of the hub 1 immediately inwardly of the ball-race 4 therein.

For a purpose to be presently explained, the inwardly presented face of the clutch cone 21 is formed with a series of radially extended teeth 24.

Removably threaded upon the portion 6 of the spindle 5 is a bearing cone 25 having a ball-race 26 opposing the race 3, there being bearing balls 27 arranged in the said races. The outer face of this bearing cone is formed with a number of teeth 28 or is otherwise roughened so as to bear against the inner side of that rear fork of the bicycle or motor-cycle frame through which this end of the spindle 5 is fitted, there being a nut 29 threaded upon the said end of the spindle and bearing against the outer side of the said fork. At this point it may be stated that a nut 30 is threaded upon the opposite end of the spindle and the other rear fork is confined between this threaded nut and the outer face of the bearing cone 8. For a purpose to be presently explained the bearing cone 25 is formed upon its inner face with an inwardly projecting cylindrical portion 31. An expansible shell 32 is fitted at one end over the cylindrical portion 31 of the bearing cone 25 and is formed at one side with a longitudinally extending slot 33 terminating in notches 34 and 35 located at the outer and inner ends of the shell, respectively. The shell is also formed at its outer and inner ends, respectively, with notches 36 and 37 located directly opposite the notches 34 and 35 respectively and the cylindrical extension 31 of the bearing cone 25 is formed with lugs 38 which engage in the notches 34 and 36 and serve to hold the expansible sleeve against rotation with respect to the said cone 25. The shell is slightly tapered exteriorly from its outer to its inner end as clearly shown in Figs. 1 and 2 of the drawings and is formed interiorly at its inner end with a conical face 39. For coöperation with the clutch cone 21 there is provided a cone 40 having radial teeth 41 upon its outer face presented toward and arranged to coöperate with the teeth 24 upon the inner face of said clutch cone 21 and this cone 40 is slidable upon the spindle 5 and has bearing against it one end 42 of a spring 43 which has its other end 44 bearing against the inner face of the bearing cone 25 and surrounded by the cylindrical extension 31 of this said cone. The spring 43 serves to firmly hold the cone 40 in the direction of the clutch cone, the cone 40 being limited in its movement in this direction by the abutment of its outer face against the inner ends of the threaded sleeve 18 upon the head 9. The cone 40 has its inwardly presented conical side 45 fitting into the inner end of the expansible shell 32 and against the conical bearing face 39 thereof and it will be readily understood at this point that should the cone 40 be forced to the left in Fig. 2 of the drawings against the tension of the spring 43, the expansible shell 32 will be expanded within the hub 1 and against the inner wall thereof. The cone 40 is formed with oppositely located lugs 46 which engage in the notches 35 and 37 at the said inner end of the conical shell, the said cone 40 being in this manner held against rotation with respect to the said shell.

It will be observed from inspection of Fig. 5 of the drawings that the end helices of the spring 43 are in a plane at right angles to the axis of the spring, and that consequently there will be no tendency for the cone 40 to cant.

The operation of the brake is as follows:—As the rider of the bicycle or motorcycle to which the brake embodying the present invention is applied, pedals forwardly, the sprocket 14 will be rotated forwardly and the threaded sleeve 18 will be rotated in a corresponding direction. This rotation of the sleeve 18 will serve to draw the clutch cone 21 to the right in Figs. 1 and 2 of the drawings until its serrated clutch face 22 is in clutching engagement with the clutch face 23 within the hub 1. Continued rotation of the sprocket 14 and the clutch cone in a forward direction will serve to correspondingly rotate the hub 1, thereby turning the wheel of which the hub forms a part. At each turn, the spring 43 will hold the expanding cone 40 in the direction of the clutch cone 21, although the former is held spaced with respect to the latter by reason of the engagement of its outer face against the inner end of the sleeve 18. Should the rider desire to coast, he merely ceases to pedal. As the clutch cone 21 is clutched with the hub 1, the forward rotation of the hub will serve to unthread the clutch cone from the sleeve 18 to such degree as to bring its clutch face 22 out of clutch engagement with the face 23 within the hub. The hub will be free to rotate forwardly independently of the sprocket 14; also the teeth 24 will, upon such unthreading of the clutch cone 21 be brought into engagement with the teeth 41 upon the expanding cone 40. Should the rider wish to apply the brake, he back pedals, thereby rotating the sprocket 14 rearwardly, and inasmuch as the clutch cone 21 is held against rotation in a rearward direction, by the engagement of its teeth 24 with the teeth 41 of the expanding cone 40, the said clutch cone will be further unthreaded from the sleeve 18 and the expanding cone 40 will be forced to the left in Figs. 1 and 2 of the drawings and into the inner end of the expansible shell 32. This movement of the expanding cone into the expansible shell will serve to expand the latter against the inner surface of the hub 1, thereby retarding or preventing forward rotation of the hub. Such movement of the expanding cone is, of course, against the tension of the spring 43 and due to the fact that the expansible shell 32 is resilient and is provided with the conical surface 39 coöperating with the end of the expanding cone 40, and the shell has a tendency to contract, the tendency will of course be for the shell to eject the cone. It is thought that without further explanation it will be apparent that when the operator desires to coast he may do so by merely releasing the backward pressure upon the pedals and that he may propel the bicycle forwardly by pedaling forwardly

Having thus described the invention what is claimed as new is:—

1. In a coaster brake, a fixed spindle, a head rotatable upon the spindle, a bearing member fixed upon the spindle, an expansible shell fitted to the bearing member and fixed with relation thereto, an expanding cone fitting into the shell and slidable upon the spindle and arranged, when slid in the direction of the shell, to expand the same, the head being provided with an exteriorly threaded sleeve extension, a clutch cone threaded thereon and having a clutch face and arranged upon its inner side to clutch with the expanding cone, and a hub surrounding the shell and clutch and expansible cones and rotatable between the head and the bearing member and provided interiorly with a clutch surface for coöperating with the clutch face of the clutch-cone.

2. In a coaster brake, a fixed spindle, a head rotatable upon the spindle, a bearing member fixed upon the spindle, an expansible sleeve fitted to the bearing member and formed with a notch, the bearing member being provided with a lug engaging in the notch in the sleeve whereby to hold the sleeve fixed with relation to the bearing member, an expansible cone fitted into the shell and slidable upon the spindle and arranged, when slid in the direction of the shell to expand the same, the said expanding cone being provided with a lug and the expansible shell having a notch receiving the lug whereby the cone is held against rotation with relation to the shell, the head being provided with an exteriorly threaded sleeve extension, a clutch cone threaded thereon and having a clutch face and arranged upon its inner side to clutch with the expanding cone, and a hub surrounding the shell and the clutch and expanding cones and rotatable between the head and the bearing member and provided interiorly with a clutch surface for coöperating with the clutch face of the clutch-cone.

3. In a coaster brake, a fixed spindle, a head rotatable upon the spindle, a bearing member fixed upon the spindle, an expansible shell fitted to the bearing member and fixed with relation thereto, an expanding cone fitting into the shell and slidable upon the spindle, and arranged when slid in the direction of the shell, to expand the same, the head being provided with an exteriorly threaded sleeve extension, a clutch cone threaded thereon and having a clutch face and arranged upon its inner side to clutch with the expanding cone, the clutch cone having a serrated clutch face, and a hub surrounding the shell and the clutch and expanding cones and rotatable between the head and the bearing member and provided interiorly with a clutch surface for coöperation with the serrated clutch face of the clutch cone.

4. In a coaster brake, a fixed spindle, a head rotatable upon the spindle, a bearing member fixed upon the spindle, an expansible shell fitted to the bearing member and fixed with relation thereto, the said shell having a normal tendency to contract, an expansible cone fitting in the shell and slidable upon the spindle and arranged, when slid in the direction of the shell to expand the same, the said expansible cone having its portion fitting within the shell of the conical cone and the shell having an internal conical surface portion coöperating with the said portion of the cone, the tendency of the shell to contact serving to normally tend to force the expanding cone from the shell, the head being provided with an exteriorly threaded sleeve extension, a clutch cone threaded thereon and having a clutch face and arranged upon its inner side to clutch with the expanding cone, a spring arranged within the shell and bearing at one end against the bearing member and at its other end against the expanding cone, and a hub surrounding the shell and the clutch and expanding cones and rotatable between the head and the bearing member and provided interiorly with a clutch surface for coöperating with the clutch face of the clutch-cone.

5. In a coaster brake, a fixed spindle, a head rotatable upon the spindle, a bearing member fixed upon the spindle and having an inwardly projecting cylindrical extension, an expansible shell fitted at one end upon the said extension and exteriorly tapered in the direction of its other end and provided at its latter end exteriorly with a conical surface portion, means holding the expansible shell against rotation, an expanding cone having a conical portion fitting within the last mentioned end of the expansible shell, a spring extending at one end into the cylindrical extension of the bearing member and at its other end bearing against the expanding cone, the said expanding cone being slidable upon the spindle and arranged, when slid in the direction of the shell, to expand the same, the head being provided with an exteriorly threaded sleeve extension, a clutch cone threaded thereon and having a clutch face and arranged upon its inner side to clutch with the expanding cone and when moved toward the same, and a hub surrounding the shell and clutch and expanding cones and rotatable between the head and the bearing member, the said hub being provided interiorly with a surface portion for coöperation with the clutch member.

6. In a coaster brake, a fixed spindle, a head rotatable upon the spindle, a bearing member fixed upon the spindle, an expansible shell fitted to the bearing member and fixed with relation thereto, an expanding cone fitting into the shell and slidable upon the spindle and arranged, when slid in the direction of the shell, to expand the same, the head being provided with an exteriorly threaded sleeve extension projecting in the direction of the expanding cone, a spring bearing against the other side of the said expanding cone and tending to normally hold the same against the end of the sleeve extension, a clutch cone threaded upon the sleeve extension and having a clutch face arranged upon its inner side to clutch with the expanding cone, and a hub surrounding the shell and the clutch and expanding cones and rotatable between the head and the bearing member and provided interiorly with a clutch surface for coöperating with the clutch face of the clutch-cone.

7. In a coaster brake, a fixed spindle, a head rotatable upon the spindle, an expansible shell surrounding the spindle, means for holding the shell against rotation, a rotatable hub inclosing the shell, an expanding cone fitting into the shell and slidable with respect to the spindle and arranged, when slid in the direction of the shell, to expand the same, the head being provided with an exteriorly threaded sleeve extension, the hub being provided interiorly with a clutch face, and a clutch-cone threaded upon the sleeve extension of the head and having a clutch face for coöperation with the clutch face of the hub, and a clutch face for coöperation with the expanding cone.

In testimony whereof I affix my signature in presence of two witnesses.

GUY ZIMMERMAN. [L. S.]

Witnesses:
  GEO. JAQUES,
  S. H. SCANLAND.